Feb. 2, 1960 F. J. STEINKE 2,923,497
POWER STEERING MECHANISM FOR AIRCRAFT LANDING GEAR
Filed Dec. 10, 1956 3 Sheets-Sheet 1

INVENTOR.
FRED J. STEINKE
BY
William N. Antonia
ATTORNEY

INVENTOR.
FRED J. STEINKE
BY
William N. Antonis
ATTORNEY

United States Patent Office 2,923,497
Patented Feb. 2, 1960

2,923,497
POWER STEERING MECHANISM FOR AIRCRAFT LANDING GEAR

Fred J. Steinke, South Bend, Ind., assignor to Bendix Aviation Corporation, South Bend, Ind., a corporation of Delaware Application December 10, 1956, Serial No. 627,300

7 Claims. (Cl. 244—50)

This invention relates to power steering and more particularly to a power steering mechanism for aircraft.

An object of this invention is to provide a simply constructed power steering mechanism for a three tube strut in a minimum amount of space.

Another object of this invention is to provide a power steering mechanism to effect power steering for an aircraft nose wheel in a more efficient, inexpensive and satisfactory manner than has heretofore been known.

An important object of this invention is to provide a hydraulic steering mechanism connected to a steered member in a manner whereby motion is transmitted thereto and the cause for producing said motion is nullified by movement of said member.

A further object of this invention is to provide a power steering mechanism incorporating a sleeve restoring device for eliminating "play" in the steering control linkage.

A still further object of this invention is to provide a power steering mechanism incorporating stop means for manual steering in the event of power failure.

The above and other objects and features of the invention will be apparent from the following description of the apparatus taken in connection with the accompanying drawings which form a part of this specification, and in which:

Figure 5 is a sectional view taken along line 5—5 of Figure 3; and

Figure 6 is a sectional view taken along line 6—6 of Figure 2.

Figure 1:
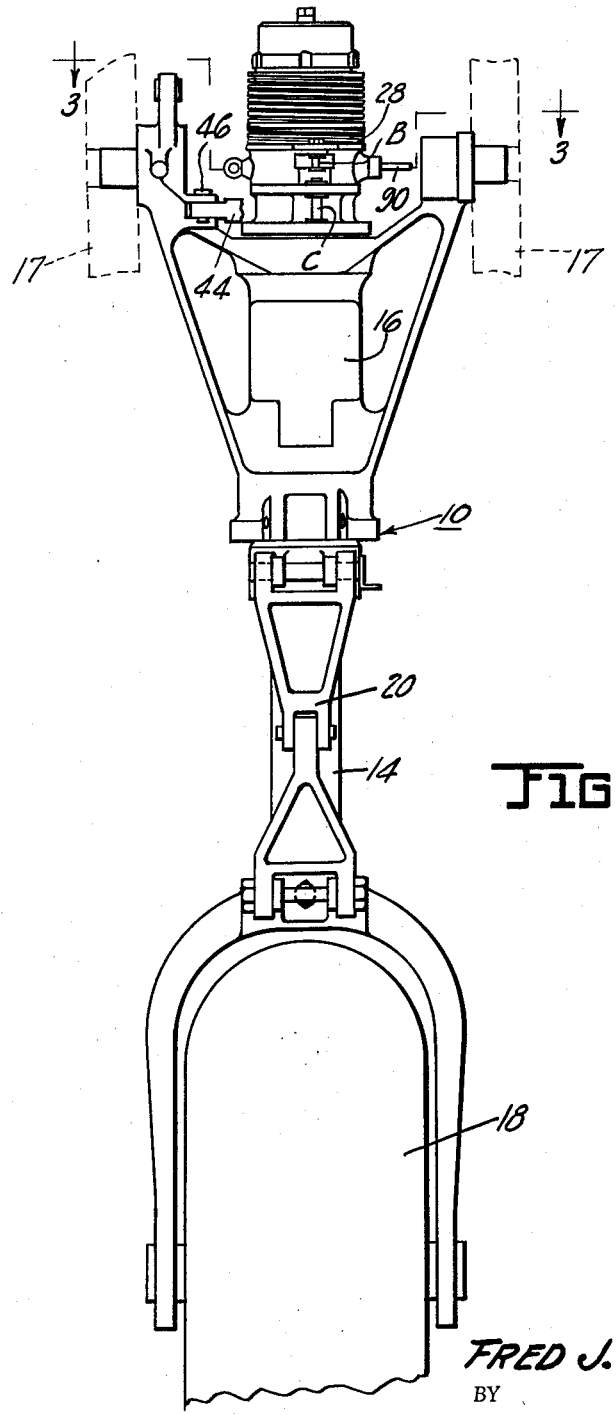
Figure 1 is a front elevation of a nose wheel strut which does not include the hydraulic motor and control valve assembly but which indicates the points at which the valve spool, power cylinder, and piston rod are attached thereto.
Figure 2:
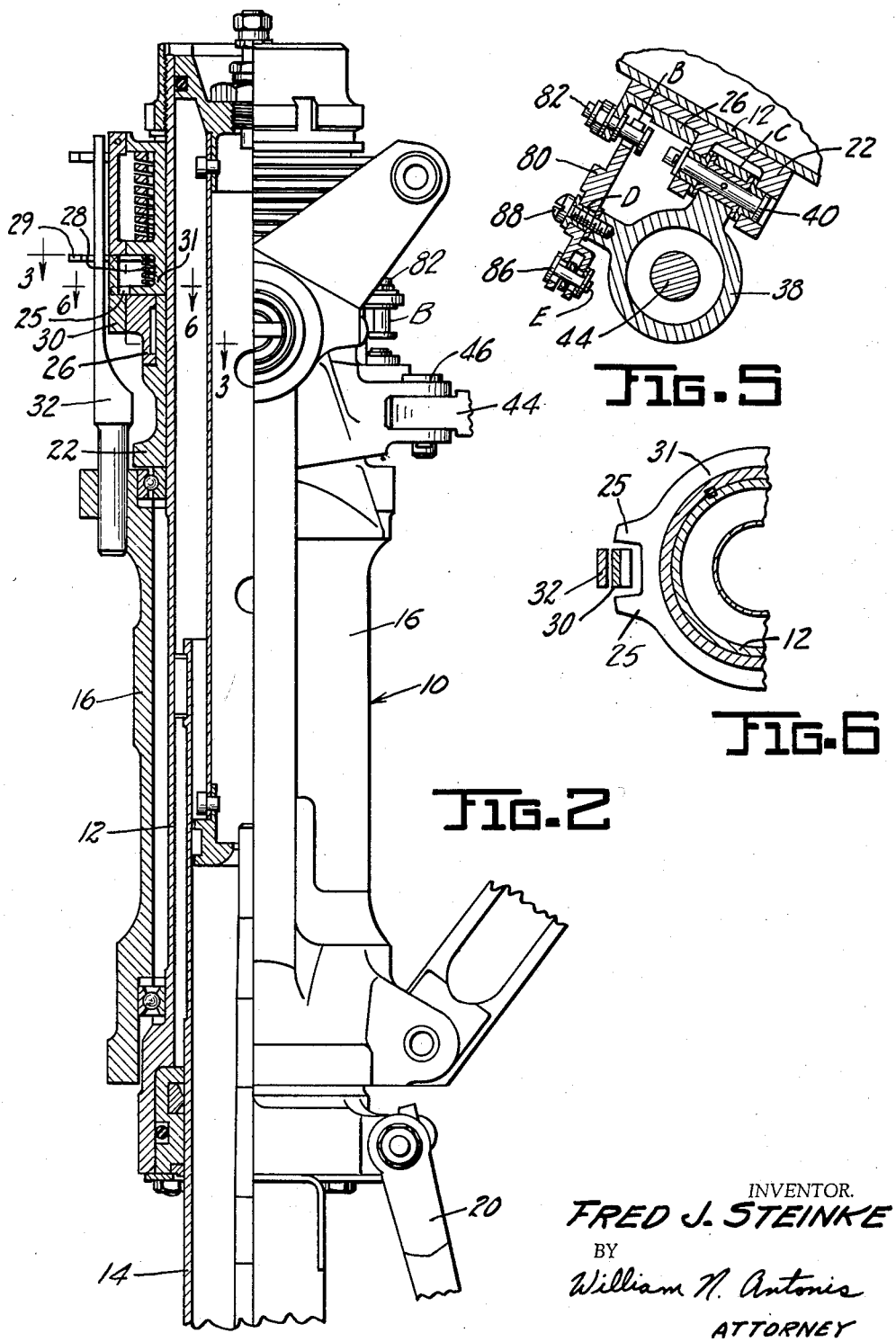
Figure 2 is a sectional view taken along line 2—2 of Figure 3 which includes only the hydraulic motor and control valve connection points.

Referring to the drawings, Figures 1 and 2 show a three tube shock strut or landing gear 10 which includes an outer or steerable cylinder 12, an inner cylinder 14 which telescopes within the outer cylinder 12, and an outer sleeve and trunnion member 16 adapted to be connected to the frame 17 of an aircraft. A ground engaging wheel 18 is mounted on the inner or telescoping cylinder and a conventional shock absorbing mechanism is incorporated into the strut to absorb the impacts which occur during landing and take-off of the aircraft as well as to support the weight of the aircraft when it is on the ground. A pair of torque links 20 which connect the outer and inner cylinders 12 and 14 impart rotative motion from one to the other while permitting telescopic action between the two.

Figure 3:
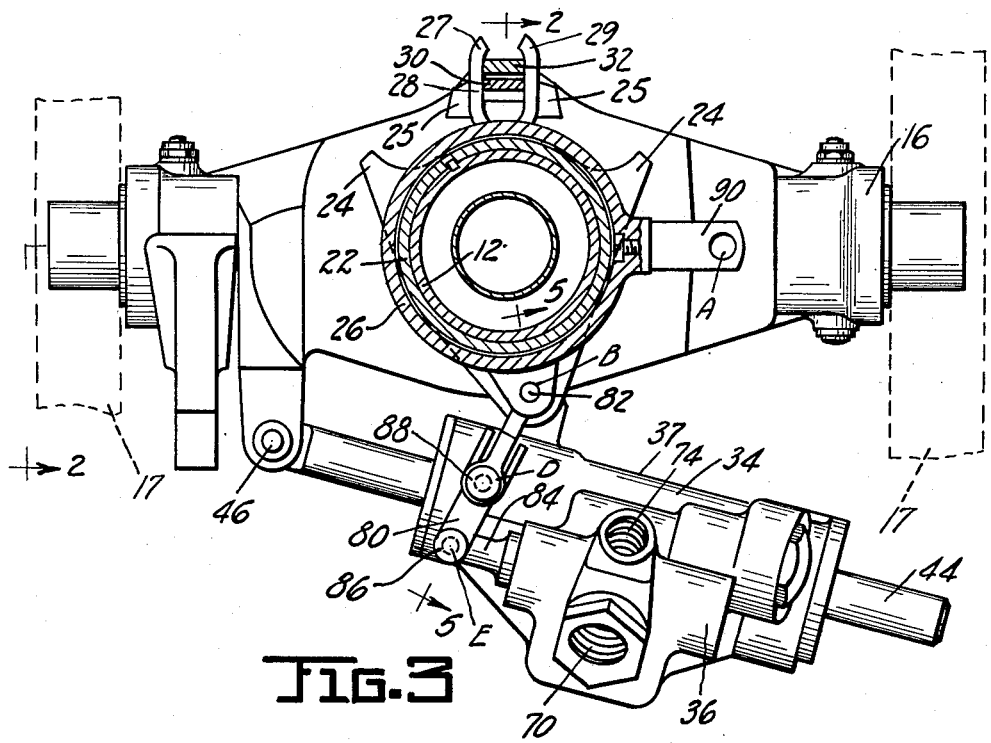
Figure 3 is a top view of the strut and steering mechanism showing a partial section of the strut taken substantially along lines 3—3 of Figures 1 and 2.

Figures 2 and 3 indicate a steering collar 22, having stops 24 fixed thereto, which is keyed to the outer or steerable cylinder 12. A steering sleeve 26 having a restoring and stop post 30 affixed thereto is rotatable relative to steering collar 22 within the limits of stops 25 which are formed on cylindrical member 31. This can be more clearly seen by reference to Figure 6 which shows that this limiting of the relative movement between sleeve 26 and collar 22 is due to the abutment of stop post 30 with the opposed stops 25 of cylindrical member 31. It should be noted that cylindrical member 31 is also keyed to the outer or steerable cylinder 12, as shown in Figure 6, so that the collar 22 and cylindrical member 31 will have the same relative movement with respect to steering sleeve 26. Stops 25 are formed on cylindrical member 31 as shown in Figures 3 and 6 to provide manual steering in the event of power failure, while stops 24 are provided so as to limit steering to a predetermined maximum turning angle. Use of these stops will subsequently be explained in greater detail. A sleeve restoring torsion spring 28, having end portions 27 and 29, is helically wound about the cylindrical member 31 and is maintained under stress by the restoring and stop post 30 which as previously explained is fixed to the sleeve 26 and a spring actuator post 32 which is fixed to the outer sleeve and trunnion member 16.

Figure 4:
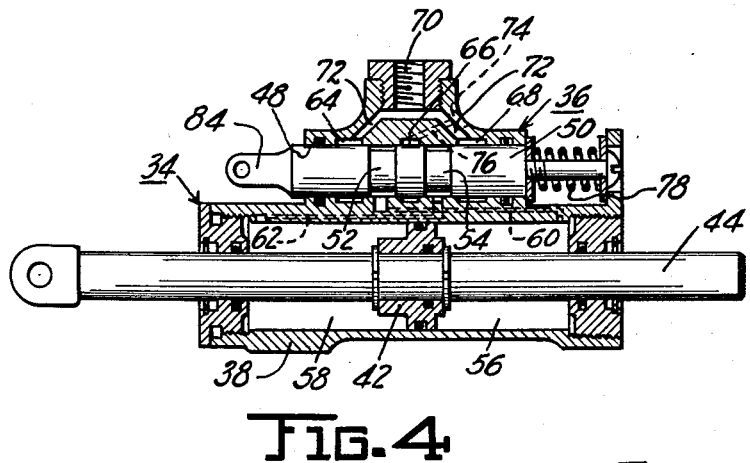
Figure 4 is a sectional view of the hydraulic motor and control valve.

As shown in Figures 2, 4, and 5, a hydraulic steering assist is provided by a hydraulic motor 34 which is controlled by a spool type control valve 36. It should be noted that the motor and valve have a common housing 37. The hydraulic motor includes a cylinder 38 which is mounted to the steering collar 22 by a pinned connection indicated by the reference numeral 40, and a piston 42 slidable therein having its piston rod 44 pinned to the outer sleeve and trunnion member by a connection 46. The control valve 36 is of the closed center type and is intended to be used in a hydraulic system which includes a reservoir, a pump, a pressure regulator, and an accumulator, none of which are shown. The housing 37 includes a bore 48 and a valve member 50 slidable in said bore in opposite directions from a normally neutral or center position. The valve member is formed with two annular channels 52 and 54 which communicate with cylinder chambers 56 and 58, respectively, via passages 60 and 62. The bore 48 is provided with annular channels 64, 66 and 68, annular channels 64 and 68 communicating with an outlet port 70 via passages 72, and annular channel 66 communicating with an inlet port 74 via passage 76. The annular channels are spaced in the bore and on the valve member so that in the neutral position there will be no communication between channels. A preloaded centering spring 78 located on one end of the spool urges the valve member towards its neutral position upon movement of the valve member in either direction.

The control valve is actuated by a lever 80 which has one end attached to the steering sleeve 26 by means of a pinned connection 82 and the other end connected to an extension 84 of the valve member by a pinned connection 86. The lever 80 is slotted at connection points 82 and 86. An intermediate point of the lever 80 is pivotally connected to the housing 37 by a screw 88. The control valve may be actuated by the pilot from rudder pedals (not shown) by a cable differential mechanism having one end connected to the rudder T-bar and the other end fixed through an adjustable linkage to a lug 90 on the steering sleeve 26.

Operation of the steering mechanism will be as follows:

A steering command applied to the steering lug 90 at point "A" will rotate the steering sleeve 26 about the steering collar 22 thereby moving point "B" located at pinned connection 82. Movement of point "B" will cause the lever 80 to pivot about point "D" causing movement of the valve spool 50 through point "E" located at pinned connection 86. Movement of the valve spool causes the annular channels in the valve to overlap thereby communicating one of the cylinder chambers to the inlet port and the other cylinder chamber of the outlet port. Consequently, since the piston rod 44 is fixed to the trunnion member 16 by pinned connection 46, the cylinder 38 will move relative to the piston, thereby rotating the steering collar 22 and steerable cylinder 12 through attach point "C" located at pinned connection 40, in the required direction until points "B," "C," "D," and "E" regain their original neutral relationship with respect to the steering mechanism. As a result of this follow-up action, when the neutral relationship of the points is reached the valve member 50 will be in its center position. The steerable cylinder 12 is then in the position requested by the applied command and will remain in this position until another command is given. The valve spool centering spring 78 eliminates all errors in the follow-up function of the steering unit by maintaining all valve clearances and connections in the same neutral relationship existing prior to the application of a steering command.

In the event of power failure the steering command applied to the steering lug 90 at point "A" will rotate the steering sleeve 26 and stop post 30, which is affixed to sleeve 26, about the steering collar 22 until post 30 makes contact with one of the stops 25 formed on cylindrical member 31. Continued rotation of steering sleeve 26 will then cause post 30 to rotate the cylindrical member 31 and steerable cylinder 12 to which member 31 is keyed. Thus during manual steering, outer or steerable cylinder 12 and inner wheel carrying cylinder 14 (connected by torque links 20) are rotated through cylindrical member 31 which is keyed to cylinder 12, whereas, during power assist the inner and outer cylinders 12 and 14 are rotated through collar 22 which is also keyed to cylinder 12.

The sleeve restoring device incorporated in my steering mechanism includes spring 28, stop post 30 and actuator post 32. When a steering command is applied at point "A," as previously explained, the sleeve 26 will begin to rotate relative to collar 22. When this occurs spring 28 will tend to resist motion of the sleeve in its given direction since stop post 30 which is attached to the sleeve, and actuator post 32 which is fixed to the trunnion, both abut the spring end portions 27 and 29, and movement of the stop post 30 relative to the actuator post 32 increases the stress in the spring. Consequently, a reaction force occurs during any given steering command which eliminates all play in the control linkage. By maintaining a load acting against the control link of sufficient force to cause the steering unit to follow the link when the command is decreased, positive steering is provided at all times. During any steering application the sleeve 26 is allowed to lead the collar 22 by a fixed angle determined by the stops 25 which are fixed to the cylindrical member 31. Stops 24 which are connected to the collar 22 are provided in order to establish a maximum turning angle. Thus turning of collar 22 and cylinder 12 in the manner previously described beyond the maximum turning angle will be prevented by the abutment of one of the stops 24 with post 32 which is fixed to the outer sleeve and trunnion member 16.

Although my invention has been described in connection with a certain specific embodiment, the principles are susceptible to numerous other applications that will readily occur to persons skilled in the art.

Having thus described the various features of my invention what I claim as new and desire to secure by Letters Patent is:

1. In an aircraft having a frame, a steering mechanism comprising first and second telescoping and conjointly rotatable members, one of said members being provided with a ground engaging member, a third cylindrical member surrounding said first and second members and mounted to the frame of said aircraft, a collar connected to one of said rotatable members, a sleeve concentric with said collar and rotatable relative thereto, motor means including first and second relatively movable elements, one of said elements being connected to said collar and the other to said third member, valve means for controlling said motor means, said valve means being integral with said motor means, actuating means connected to said valve means and to said sleeve, said actuating means being pivotally connected to said motor means, and passage means for communicating said valve means with said motor means.

2. In an aircraft having a frame, a steering mechanism comprising first and second telescoping and conjointly rotatable members, one of said members being provided with a ground engaging member, a third cylindrical member surrounding said first and second members and mounted to the frame of said aircraft, a collar connected to one of said rotatable members, a sleeve concentric with said collar and rotatable relative thereto, a power cylinder having a piston slidable therein, said cylinder being connected to said collar and said piston being connected to said third member, valve means for controlling said power cylinder, said valve means being integral with said power cylinder and having a valve member slidable therein, an actuating lever having one end connected to said valve member and the other end connected to said sleeve, said actuating lever being pivotally connected to a point intermediate said ends to said power cylinder, and passage means for communicating said valve means with said power cylinder.

3. A steering mechanism for the nose wheel of an aircraft comprising steerable and non-steerable elements, a collar rigidly connected to the steerable element, a sleeve concentric with said collar and rotatable relative thereto, means extending from said sleeve, stop means operatively connected to said collar and steerable element for limiting relative rotative movement of said sleeve with respect to said collar and steerable element upon making contact with said means extending from said sleeve, a power cylinder connected to said collar, a piston slidable in said cylinder and connected to the non-steerable element, a valve housing integral with said power cylinder, a valve member slidable in said valve housing for controlling movement of said cylinder, a lever connected to said valve member and said sleeve, said lever being pivotally connected to said power cylinder for actuating said valve member upon movement of said sleeve, and passage means for communicating said valve housing with said power cylinder.

4. A steering mechanism for the nose wheel of an aircraft comprising steerable and non-steerable elements, a collar rigidly connected to the steerable element, a sleeve concentric with said collar and rotatable relative thereto, means extending from said sleeve, stop means operatively connected to said collar and steerable element for limiting relative rotative movement of said sleeve with respect to said collar and steerable element upon making contact with said means extending from said sleeve, spring means operably connected to said sleeve and said non-steerable element for opposing movement of said sleeve, a power cylinder connected to said collar, a piston slidable in said cylinder and connected to the non-steerable element, a valve housing formed on said power cylinder, a valve member slidable in said valve housing for controlling movement of said cylinder, a lever connected to said valve member and said sleeve, said lever being pivotally connected to said power cylinder for actuating said valve member upon movement of said sleeve, and passage means for communicating said valve housing with said power cylinder.

5. In an aircraft having a frame, a steering mechanism comprising first and second telescoping and conjointly rotatable members, one of said members being provided with a ground engaging member, a third cylindrical member surrounding said first and second members and mounted to the frame of said aircraft, a collar rigidly connected to one of said rotatable members, a sleeve concentric with said collar and rotatable relative thereto, means extending from said sleeve, stop means operatively connected to said collar for limiting relative rotative movement of said sleeve with respect to said collar upon making contact with said means extending from said sleeve, spring means operably connected to said sleeve and said third member for opposing movement of said sleeve, motor means including first and second relatively movable elements, one of said elements being connected to said collar and the other to said third member, valve means for controlling said motor means, said valve means being integral with said motor means, actuating means connected to said valve means and to said sleeve, said actuating means being pivotally connected to said motor means, means connected to said sleeve for rotating said sleeve, and passage means for communicating said valve housing with said power cylinder.

6. An aircraft steering mechanism comprising an outer cylinder, an inner cylinder slidable within said outer cylinder, a pair of torque links connecting the inner and outer cylinders for imparting rotative motion from one to the other, a wheel carrying member attached to said inner cylinder, a stationary outer sleeve and trunnion member surrounding said inner and outer cylinders, a steering collar connected to said outer cylinder, a steering sleeve surrounding said collar and rotatable relative thereto, a power cylinder having a piston slidable therein, said cylinder being connected to said steering collar and said piston being connected to said outer sleeve and trunnion member, a control valve having a housing integral with said power cylinder, a valve member slidable within said housing, an actuating lever having one end connected to said valve member, the other end to said steering sleeve and an intermediate point pivotally connected to said power cylinder, means connected to said steering sleeve for rotating said steering sleeve about said steering collar, and passage means for communicating said control valve with said power cylinder.

7. An aircraft steering mechanism comprising an outer cylinder, an inner cylinder slidable within said outer cylinder, a pair of torque links connecting the inner and outer cylinders for imparting rotative motion from one to the other, a wheel carrying member attached to said inner cylinder, a stationary outer sleeve and trunnion member surrounding said inner and outer cylinders, a steering collar keyed to said outer cylinder, stop means operatively connected to said steering collar, a steering sleeve surrounding said collar and rotatable relative thereto between said stop means, a sleeve restoring torsion spring operably connected to said steering sleeve and to said stationary outer sleeve and trunnion, a power cylinder having a piston slidable therein, said cylinder being connected to said steering collar and said piston being connected to said outer sleeve and trunnion member, a control valve having a housing integral with said power cylinder, a valve member slidable within said housing, an actuating lever having one end connected to said valve member, the other end to said steering sleeve and an intermediate points pivotally connected to said power cylinder, means connected to said steering sleeve for rotating said steering sleeve about said steering collar, and passage means for communicating said control valve with said power cylinder.

References Cited in the file of this patent
UNITED STATES PATENTS

| | | |
|---|---|---|
| 2,418,325 | Wassall et al. | Apr. 1, 1947 |
| 2,622,827 | Hayman et al. | Dec. 23, 1952 |